No. 610,663. Patented Sept. 13, 1898.
J. H. RANDOLPH.
HORSE RAKE.
(Application filed Mar. 10, 1898.)
(No Model.)
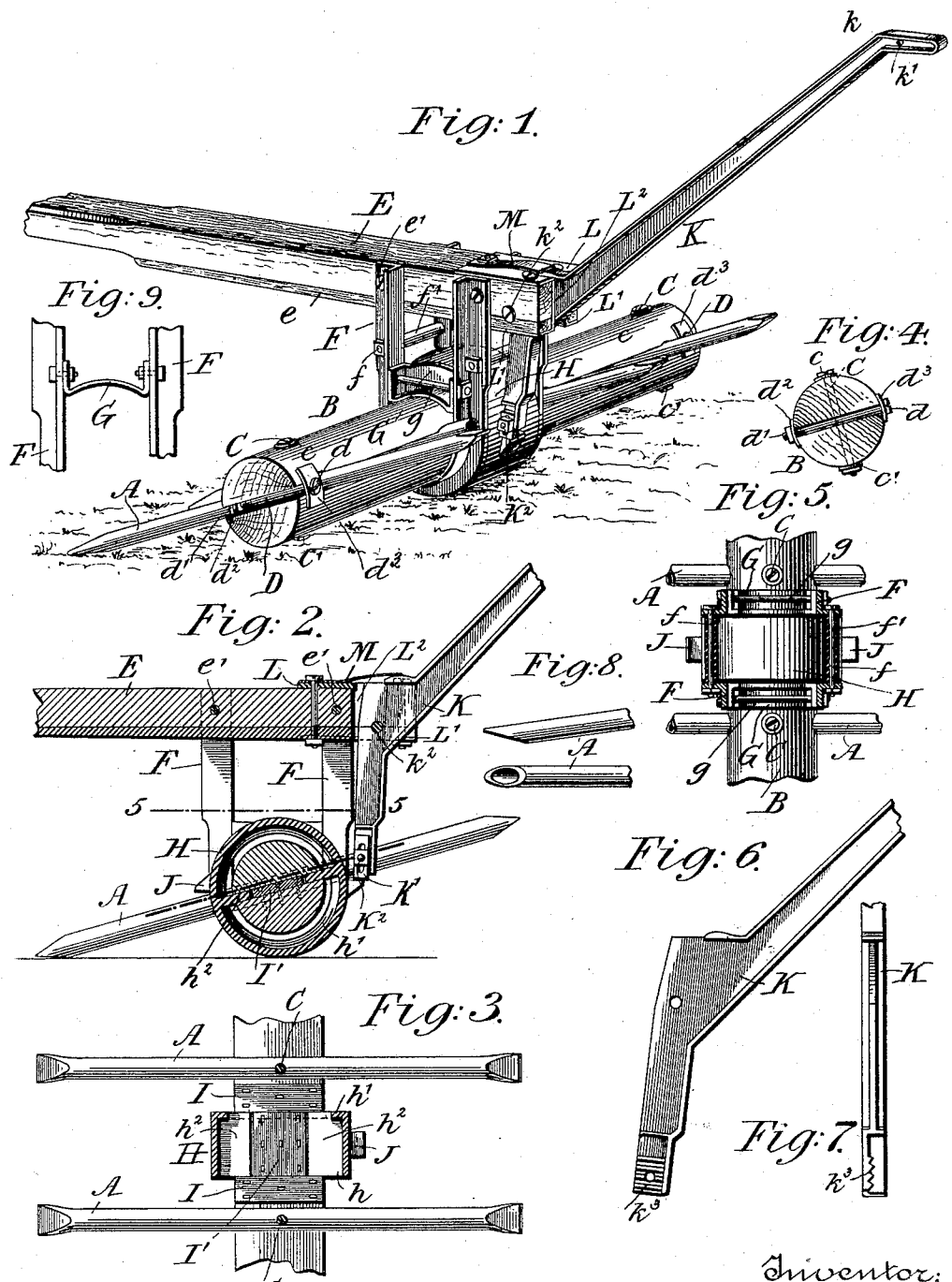
Witnesses:
J. A. Rennie
E. A. Bulloch
Inventor:
John H. Randolph,
By his Attorneys,
Baldwin, Davidson & Wight

UNITED STATES PATENT OFFICE.

JOHN H. RANDOLPH, OF BATON ROUGE, LOUISIANA.

HORSE-RAKE.

SPECIFICATION forming part of Letters Patent No. 610,663, dated September 13, 1898.

Application filed March 10, 1898. Serial No. 673,384. (No model.)

*To all whom it may concern:*

Be it known that I, JOHN H. RANDOLPH, a citizen of the United States, residing at Baton Rouge, in the State of Louisiana, have invented certain new and useful Improvements in Horse-Rakes, of which the following is a specification.

My invention relates to that class of horse-rakes in which a revolving head is provided with teeth centrally secured, which in operation are tripped and caused automatically to revolve as desired, so as to bring to the front and into operation the rear teeth or those ends of the teeth previously projecting to the rear and to free the teeth previously in operation from the gathered load. Rakes of this description are shown in my Patents No. 208,267, dated September 24, 1878, and No. 543,563, dated July 30, 1895. In my former patents I have shown rake-heads perforated to permit the teeth to be inserted and held in place. The rake-head is provided with a hub or ring provided with cams or stops, and a lever pivoted to the tongue is employed to engage with stops on the hub to hold the teeth in operation. By releasing the lever the teeth may be automatically tripped and reversed.

According to my present invention I improve the form of the rake-head by dividing it longitudinally and clamping the teeth between the two sections. I also improve the teeth by making them hollow instead of solid, as heretofore, and the hub, as well as the hangers, is considerably modified and much improved. The details of construction and the particular points of novelty are hereinafter fully described.

In the accompanying drawings, Figure 1 is a perspective view of a horse hay-rake or pea-vine puller constructed in accordance with my invention. Fig. 2 shows a vertical longitudinal section of the same. Fig. 3 is a detail view showing particularly the manner of securing the teeth to the rake-head and the manner of attaching the hub to the rake-head. Fig. 4 shows a cross-section of the rake-head. Fig. 5 shows a horizontal section of the machine on the line 5 5 of Fig. 2. Fig. 6 is a detail view, in side elevation, of the operating-lever. Fig. 7 is a front or edge view of the same. Fig. 8 shows a side elevation and plan of the end of a modified form of tooth. Fig. 9 shows a modified way of attaching the two branches of one of the hangers.

The teeth A are cylindrical and tubular, the ends being sharpened or beveled, as indicated in Figs. 2 and 3. Instead of beveling the ends of the teeth in both directions they may be formed as shown in Fig. 8. The rake-head B is cylindrical, but is centrally divided longitudinally, and each section is formed with transverse grooves to receive the teeth A. These grooves are shallower than the teeth, so that when the rake-head sections are secured together the teeth will be clamped. Bolts C extend through both sections of the rake-head and through the teeth and serve not only to secure the rake-head sections together, but also to hold the teeth in place. The bolts may be headed, as shown at $c$, a washer may be interposed between each head and the rake-head, and a nut and washer $c'$ may be used on the screw-threaded end of the bolts. The bolts C are arranged at right angles to the teeth.

In order to further strengthen the rake-head and prevent it from splitting, I employ bolts D at opposite ends of the rake-head, which extend parallel with the teeth through the space between the sections, each bolt being provided with a head $d$ and a nut $d'$, washers $d^2$ $d^3$ being interposed between the head and nut and the rake-head. These washers are quite large, extending over beyond the edges of the opening between the two sections of the rake-head, as indicated in Fig. 1. This arrangement serves to tighten the joints of the rake-head sections and to prevent them from slipping or splitting.

The tongue E is preferably made of wood, being reinforced on its under side by a wooden strip $e$, which may be secured in place in any suitable way. On opposite sides of the tongue, at its rear end, are hangers F, preferably made of angle-iron, bent into U form and having their ends secured by bolts $e'$ to the tongue. Bolts $f$ extend through the hangers below the tongue and through spacing-sleeves $f'$, which serve to hold the hangers at a proper distance apart. The curved lower portions of the hangers correspond in shape to the rake-head and constitute the lower bearings therefor.

The upper portions of the bearings of the rake-head are formed by bearing-pieces G, which may be either of the form shown in Fig. 1 or that shown in Fig. 9. The under sides of these bearing-pieces are curved to correspond with the curved surface of the rake-head, and bolts $g$, passing through the bearing-pieces and through the flanges of the hangers, secure the parts in place. A hub H is arranged around the central portion of the rake-head. At one end $h$ it is open, and at the other end it is provided with an inwardly-projecting flange $h'$, which serves to strengthen the hub; but this flange does not touch the rake-head sections, and they may be spread apart to permit the insertion or withdrawal of teeth when desired. The hub H is provided with inwardly-projecting lugs $h^2$, which extend between the two sections of the rake-head and between two strips I, secured to one section of the rake-head. Another strip I', running longitudinally of the rake-head, is secured between the strips I I, and the inner edges of the lugs are flush with the longitudinal edges of the strip I'. By this arrangement the hub is secured to the rake-head, is prevented from longitudinal movement thereon, and is caused to revolve therewith. There are lugs J projecting from the outside of the hub. These correspond with the stops in my patents before mentioned and are adapted to engage with the operating-lever K. This lever in this instance is shown as formed in one piece. It is formed with a handle portion $k$, which may be perforated at $k'$ for the attachment of a line, and it is pivoted at $k^2$ to the tongue E. At its lower end the lever is provided with a serrated portion $k^3$, adapted to engage with serrations on a block K', which is adjustably secured to the lever K by a bolt $K^2$. The rear end of the tongue is bifurcated to receive the lever. It is provided with a plate L on its upper side to strengthen it and prevent wear. It may also be provided with plates L' on its lower side and plates $L^2$ within the bifurcations for the same purpose. A spring M, secured to the tongue, bears upon the lever, holds it in place, and prevents it from moving except when positively operated.

The operation of the rake is substantially the same as that in my before-mentioned patents. When the operating-lever is in engagement with one of the lugs J, as shown in Fig. 2, the teeth will be held in operative position and the material will be gathered as the machine advances. When, however, the lever is shifted so as to be disengaged from the lugs, the teeth will be caught in the ground or in the hay or other material, the machine will be lifted, and the teeth reversed, thereby dropping the load.

I find that the changes which I have made result in very material improvements. The different parts of the machine are stronger, more durable, less apt to slip or get out of place, and operate with greater efficiency.

While I have shown and described hollow metallic teeth, I wish it understood that I do not limit myself to the use of such teeth, as wooden teeth or other kinds of teeth might be used, my invention comprehending novel combinations of devices whether used in connection with hollow teeth or other kinds of teeth.

I claim as my invention—

1. The combination of the longitudinally-divided rake-head, the hangers in which it is mounted, the hub surrounding the rake-head and arranged between the hangers and provided with inwardly-projecting lugs extending between the sections of the rake-head and secured thereto to revolve therewith.

2. The combination of the longitudinally-divided rake-head having the strips, I, I', secured to one section thereof, the hangers in which the rake-head is mounted, the hub arranged between the hangers and having lugs extending between the sections of the rake-head and between the strips, I, I', and a flange at one end of the hub, for the purpose specified.

3. The combination of the rake-head, divided longitudinally into two sections, the teeth arranged in transverse grooves in the rake-head between the sections, bolts passing through the sections of the rake-head at right angles to their dividing-line, other bolts arranged at right angles to the first-mentioned bolts passing between the two sections of the rake-head, and curved plates or washers on the ends of said last-mentioned bolts which extend across the dividing-line of the rake-head sections and bear against the edges of the opposing sections.

In testimony whereof I have hereunto subscribed my name.

JOHN H. RANDOLPH.

Witnesses:
G. L. VAY,
L. E. DROZ.